US011262726B2

(12) United States Patent
Emmenegger et al.

(10) Patent No.: US 11,262,726 B2
(45) Date of Patent: Mar. 1, 2022

(54) CABLE PROCESSING MACHINE CONTROL SYSTEM, CABLE PROCESSING MACHINE SYSTEM AND METHOD FOR MONITORING AND CONTROLLING CABLE PROCESSING MACHINES

(71) Applicant: KOMAX HOLDING AG, Dierikon (CH)

(72) Inventors: Daniel Emmenegger, Kastanienbaum (CH); Beat Arpagaus, Wolfenschiessen (CH)

(73) Assignee: KOMAX HOLDING AG, Dierikon (CH)

( * ) Notice: Subject to any disclaimer, the term of this patent is extended or adjusted under 35 U.S.C. 154(b) by 77 days.

(21) Appl. No.: 16/181,461

(22) Filed: Nov. 6, 2018

(65) Prior Publication Data

US 2019/0137970 A1 May 9, 2019

(30) Foreign Application Priority Data

Nov. 7, 2017 (EP) ..................................... 17200401

(51) Int. Cl.
*G05B 19/4063* (2006.01)
*G05B 19/042* (2006.01)
*B21F 23/00* (2006.01)
*G06F 1/16* (2006.01)

(52) U.S. Cl.
CPC .......... *G05B 19/4063* (2013.01); *B21F 23/00* (2013.01); *G05B 19/042* (2013.01); *G05B 2219/24168* (2013.01); *G05B 2219/31121* (2013.01); *G05B 2219/32365* (2013.01); *G06F 1/163* (2013.01)

(58) Field of Classification Search
CPC .............. G05B 19/4063; G05B 19/042; G05B 2219/24168; G05B 2219/31121; G05B 2219/32365; B21F 23/00; G06F 1/163
See application file for complete search history.

(56) References Cited

U.S. PATENT DOCUMENTS

| 2012/0239221 A1 | 9/2012 | Mighdoll et al. |
| 2016/0119244 A1* | 4/2016 | Wang .................. H04L 43/0817 709/226 |
| 2016/0266576 A1* | 9/2016 | Ayabakan .......... G05B 23/0216 |

FOREIGN PATENT DOCUMENTS

| EP | 2913961 A1 | 9/2015 |
| EP | 3067769 A1 | 9/2016 |
| EP | 3068002 A1 | 9/2016 |

* cited by examiner

*Primary Examiner* — Tejal Gami
(74) *Attorney, Agent, or Firm* — William J. Clemens; Shumaker, Loop & Kendrick, LLP

(57) ABSTRACT

A cable processing machine control system includes middleware for data exchange with data brokers of multiple cable processing machines, and a wearable communication device for data exchange with the middleware. When a user of the cable processing machine control system has logged into the wearable communication device, depending on a role of the user that is assigned by the middleware, different information is displayed for the user on the wearable communication device via the cable processing machines assigned to the assigned role of the user and/or different action possibilities for controlling the cable processing machines assigned to the assigned role of the user are provided for the user on the wearable communication device.

17 Claims, 1 Drawing Sheet

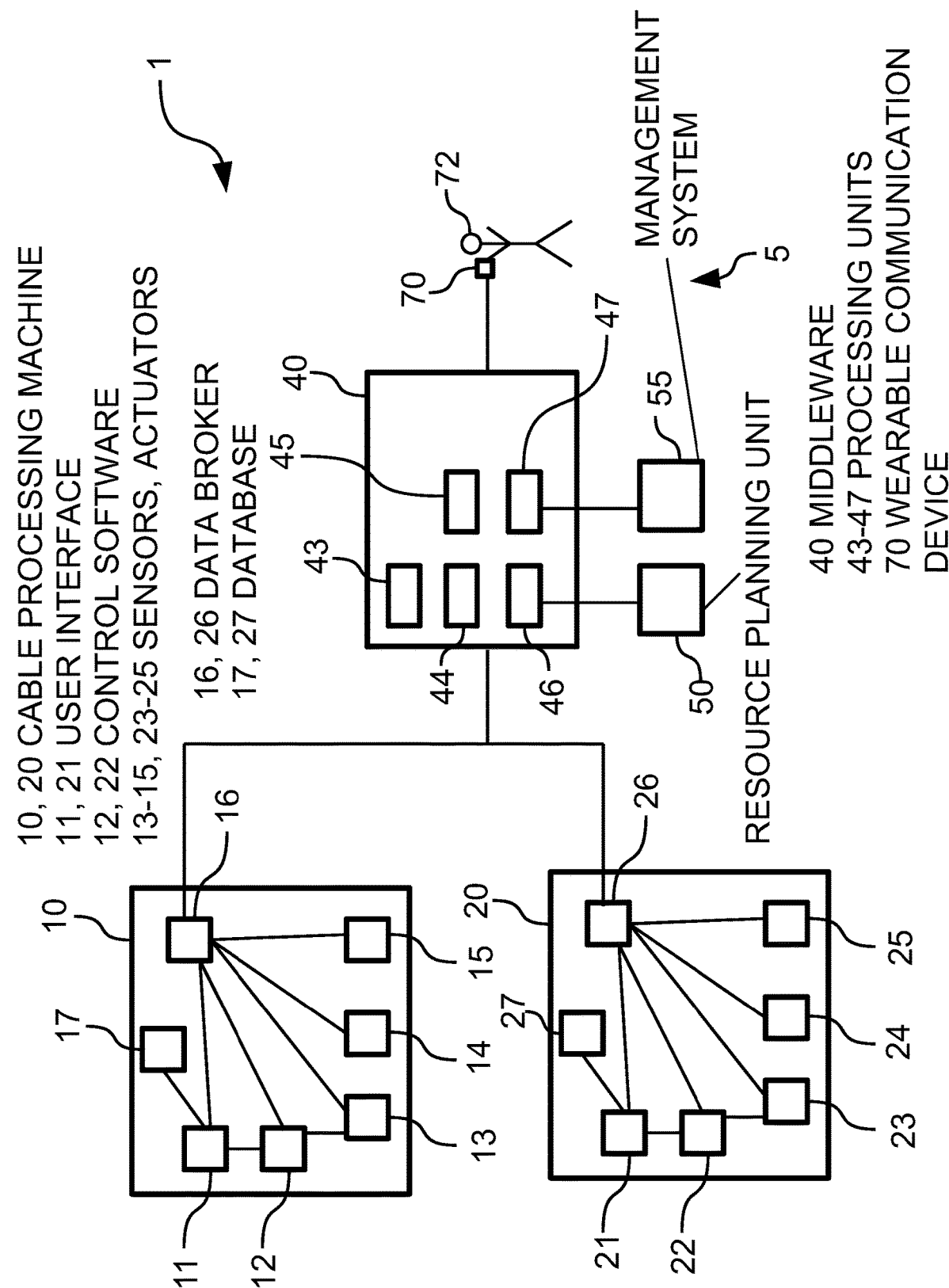

CABLE PROCESSING MACHINE CONTROL SYSTEM, CABLE PROCESSING MACHINE SYSTEM AND METHOD FOR MONITORING AND CONTROLLING CABLE PROCESSING MACHINES

FIELD

The present invention relates to a cable processing machine control system, to a cable processing machine system and to a method for monitoring and controlling cable processing machines.

BACKGROUND

In cable processing machines, a plurality of actuators is controlled and/or data is acquired by sensors. Inputs of an operator into the cable processing machines are also acquired. This data is often only available at the respective cable processing machine, for example, on a monitor of the cable processing machines. An operator or user of the cable processing machine system is usually responsible for a plurality of cable processing machines. The operator or user monitors the cable processing machines associated with or assigned to him and when necessary replaces cable processing tools and/or replaces material which is processed by the cable processing machines or refills material which is processed by the cable processing machines.

Often, the operator is only authorized to acknowledge or accept or bypass certain error messages of the cable processing machines, i.e., not all the error messages of the cable processing machines. For certain error messages, only a supervisor is authorized, who monitors, for example, several operators or has several operators below him in the hierarchy, since the supervisor has more experience or knowledge or more training in terms of which error messages of the (respective) cable processing machine can be ignored and which error messages should not be ignored. If an operator then sees an error message on one of the cable processing machines associated with him, the operator must look for the responsible supervisor (whom he may not know), inform him about the error, about the cable processing machine in question and about the cable processing process taking place on the cable processing machine in question, and subsequently the supervisor has to go to the cable processing machine in order to acknowledge or to accept the error.

This is extremely time consuming and the operator must know which person his supervisor is. In addition, the operator always has to go back and forth between the cable processing machines in order to acquire the information on the monitors of the cable processing machines associated with him. In addition, the operator must do an elaborate search for the material and/or cable processing tools necessary for one of the cable processing machines associated with him and/or assigned to him, since he does not know where the material and/or the required cable processing tool is located.

Inter alia, there may be a need for a cable processing machine control system or for a cable processing machine system or for a method for monitoring and controlling cable processing machines, in which information concerning a cable processing machine is accessible or can be made accessible to a user of the cable processing machine (for example, to an operator and/or a supervisor) in a technically simple and site-independent manner and/or in which a user of the cable processing machine can control the cable processing machine in a technically simple and site-independent manner.

SUMMARY

According to a first aspect of the invention, a cable processing machine control system is proposed, including middleware, wherein the middleware is designed for the data exchange with data brokers of multiple cable processing machines, and a wearable communication device, wherein the wearable communication device is designed for the data exchange with the middleware and is designed so that, when a user of the cable processing machine control system has logged into the wearable communication device, depending on a role of the user, which is assigned by the middleware, different information concerning the cable processing machines assigned to the assigned role of the user is displayed for the user on the wearable communication device and/or different action possibilities for controlling the cable processing machines assigned to the assigned role of the user are provided for the user on the wearable communication device.

An advantage thereof is that, as a rule, in a technically simple and site-independent manner, information or data on the cable processing machines (error messages, the cable processing process which is currently taking place, the cable processing tool present in the cable processing machine, the filling level of a collection tray, the efficiency of the cable processing machine, etc.) or data on the person at the next higher level in the hierarchy (for example, who the supervisor for an operator is) can be displayed site-independently for the user of the cable processing machine (for example, the user, a supervisor, etc.). This means that the user of the cable processing machine control system usually does not have to go from cable processing machine to cable processing machine in order to read and collect information from several cable processing machines. This information or data can be displayed normally site-independently on the wearable communication device. Aggregated data and data calculated from the primary data obtained from the middleware can usually be displayed in a technically simple and site-independent manner on the wearable communication device. In addition, as a rule, only data of the cable processing machines assigned to the user or to his role is displayed for the user. The information that is represented or can be downloaded on the wearable communication device can typically be dependent on the user role. For example, as a rule, a plant manager responsible for all the cable processing machines in an operation does not have to be informed about individual error messages of the cable processing machine or said information does not have to be displayed to him, while such information is typically very important for the operator to whom this cable processing machine is assigned and is displayed for said operator on his wearable communication device. In addition, as a rule, it is possible that the cable processing machines are controlled in a technically simple and site-independent manner or data is exchanged with the cable processing machines. Thereby it is typically possible to acknowledge, for example, error messages of a cable processing machine site-independently. Thus, for example, in the case of an occurring error of a cable processing machine, which the operator with whom or to whom the cable processing machine has been associated or assigned, respectively, is not authorized to acknowledge himself, the user can usually issue a request to the supervisor responsible for him to acknowledge the error message of the cable processing machine, without the operator of the cable processing machine having to know the supervisor and/or look for him, and without the supervisor having to go to the cable processing machines. Changes of the cable processing procedure performed by the cable processing machines or of the parameters thereof can also typically be carried out site-independently. The action possibilities provided for controlling the cable processing machine, by means of which the cable processing machine can be controlled via the wearable communication device, can depend as a rule on the role which is or was assigned to the user. Thus, typically, for example, a supervisor can have more action possibilities for controlling the cable processing machine available on "his" wearable communication device than an operator, since the supervisor (who has more training, more experience and/or more knowledge) has more rights of access to the respective cable processing machine or in the middleware/via the middleware than the operator. Thus, as a rule, the efficiency of the cable processing machines can be increased, and the duration of the interruptions in the operation of the cable processing machines can be reduced. This typically lowers the costs.

In particular, the communication or the data exchange between the wearable communication device and the middleware as well as between the middleware and the cable processing machines can take place or be carried out in an internal network (for example, an intranet), i.e., not via the internet. Thus, as a rule, the information or data exchanged is protected particularly reliably from unauthorized access.

According to a second aspect of the invention, a cable processing machine system is proposed, including multiple cable processing machines, wherein each cable processing machine comprises a data broker, wherein the respective data broker exchanges data with sensors and/or actuators of the cable processing machine on one side and with middleware on another side, and a cable processing machine control system as described above, wherein the cable processing machine control system exchanges data with the cable processing machines and/or controls the cable processing machines.

According to a third aspect of the invention, a method is proposed for monitoring and controlling cable processing machines, wherein the method includes the following steps: logging in of a user on a wearable communication device, wherein the wearable communication device is designed for the data exchange with middleware, wherein the middleware is designed for the data exchange with data brokers of multiple cable processing machines; determination of a role of the user by the middleware and assignment of the role to the user; assignment of cable processing machines to the user depending on his role; and displaying of information of cable processing machines associated with the user on the wearable communication device, wherein the displayed information is dependent on the role assigned to the user, and/or displaying of action possibilities for the control of the cable processing machines assigned to the assigned role on the wearable communication device and controlling of the cable processing machines according to the action possibility selected by the user.

An advantage of this method is that, in a technically simple and site-independent manner, information or data on the cable processing machines (error messages, the cable processing process which is currently taking place, the cable processing tool present in the cable processing machine, the filling level of a collection tray, the efficiency of the cable processing machine, etc.) or data on the person at the next higher level in the hierarchy (for example, who the supervisor for an operator is) can be displayed site-independently for the user of the cable processing machine (for example, the user, a supervisor, etc.). This means that the user of the cable processing machine control system as a rule does not have to go from cable processing machine to cable processing machine, in order to read and collect information from several cable processing machines. This information or data is displayed site-independently on the wearable communication device. Aggregated data and data calculated from the primary data obtained from the middleware can usually be displayed in a technically simple site-independent manner on the wearable communication device. In addition, typically, only data of the cable processing machines assigned to the user or to his role is displayed for the user. The information that is represented or can be downloaded on the wearable communication device can as a rule be dependent on the user role. For example, typically, a plant manager responsible for all the cable processing machines in an operation does not have to be informed about individual error messages of the cable processing machine or said information does not have to be displayed to him, while, as a rule, such information is very important for the operator to whom this cable processing machine is assigned and is displayed for said operator on his wearable communication device. In addition, typically, it is possible that the cable processing machines are controlled in a technically simple and site-independent manner or data is exchanged with the cable processing machines. Thereby it is possible, as a rule, to acknowledge, for example, error messages of a cable processing machine site-independently. Thus, for example, in the case of an occurring error of a cable processing machine, which the operator with whom or to whom the cable processing machine has been associated or assigned, respectively, is not authorized to acknowledge himself, the user can usually issue a request to the supervisor responsible for him to acknowledge the error message of the cable processing machine, without the operator of the cable processing machine having to know the supervisor and/or look for him, and without the supervisor having to go to the cable processing machines. Changes of the cable processing procedure performed by the cable processing machines or of the parameters thereof can also usually be carried out site-independently. The action possibilities provided for controlling the cable processing machine, by means of which the cable processing machine can be controlled via the wearable communication device, can depend typically on the role which is or was assigned to the user. Thus, typically, for example, a supervisor can have more action possibilities for controlling the cable processing machine available on "his" wearable communication device than an operator, since the supervisor (who has more training, more experience and/or more knowledge) has more rights of access to the respective cable processing machine or in the middleware/via the middleware than the operator. Thus, typically, the efficiency of the cable processing machines can be increased, and the duration of the interruptions in the operation of the cable processing machines can be reduced. As a rule, this lowers the costs.

Possible features and advantages of embodiments of the invention can inter alia be considered to be based, without limiting the invention, on the idea and findings as described below.

According to an embodiment, the cable processing machine control system is designed so that the role is assigned to the user depending on a role database and/or a role shift table. The advantage of this is that the role can usually be assigned in a technically simple manner to the user.

According to an embodiment, the cable processing machine control system is designed so that the cable processing machines are assigned to the role depending on a role database and/or a role shift table. An advantage of this is that the cable processing machines can typically be assigned to the roles in a technically simple manner.

According to an embodiment, the wearable communication device includes a laptop, a smartphone, a tablet computer, a smart watch and/or goggles with an optical display. The advantage of this is that the wearable communication device is as a rule cost-effective. In addition, typically, standardized wearable communication devices can be used.

According to an embodiment, the cable processing machine control system is designed so that positions of cable processing tools for the cable processing machines and/or positions of materials for the cable processing machines are acquired, and the positions of the cable processing tools and/or materials are displayed on the wearable communication device. The advantage of this is that, in the cable processing machine control system, cable processing tools and/or materials can typically be found rapidly and simply and thus a replacement of the cable processing tool and/or of the material can be carried out rapidly. As a rule, this lowers the time span or duration of operational interruptions of the cable processing machines and thus typically lowers the costs.

According to an embodiment, the cable processing machine control system is designed so that the middleware exchanges data with an enterprise resource planning unit and/or a production management system. The advantage of this is that the cable processing machine control system can usually be operated particularly efficiently.

According to an embodiment, the cable processing machine system is designed so that the middleware exchanges data with an enterprise resource planning unit and/or a production management system. The advantage of this is that the cable processing machine system can be operated as a rule particularly efficiently.

According to an embodiment, the role is associated with the user depending on a role database and/or a role shift table. The advantage of this method is that the role can typically be assigned to the user in a technically simple manner.

According to an embodiment, the information, which is displayed for the user on the wearable communication device, is received by the middleware from the cable processing machines and transmitted by the middleware to the wearable communication device, to the extent that the corresponding cable processing machine is assigned to the role of the respective user of the wearable communication device. Thereby, the user usually can exchange data with the cable processing machines in a technically simple manner, without the wearable communication device exchanging data directly with the cable processing machines. Thus, the communication between the cable processing machines and the middleware or the middleware with the wearable communication device can be typically changed independently of one another.

According to an embodiment, the middleware exchanges data with an enterprise resource planning unit and/or a production management system. The advantage of this method is that the cable processing machine system can as a rule be operated particularly efficiently.

According to an embodiment, positions of cable processing tools and/or of materials for the cable processing machines are acquired, and the positions of the cable processing tools and/or materials are displayed on the wearable communication device. The advantage of this method is that, in the cable processing machine control system, cable processing tools and/or materials can typically be found rapidly and simply, and thus a replacement of the cable processing tool and/or of the material can be carried out rapidly. As a rule, this lowers the time span or duration of interruptions of the operation of the cable processing machines and thus typically lowers the costs.

According to an embodiment of the method, the cable processing machines are associated with the role depending on a role database and/or a role shift table. The advantage of this method is that the role is usually assigned to the user in a technically simple manner.

It is pointed out that some of the possible features and advantages of the invention are described herein in reference to different embodiments. A person skilled in the art recognizes that the features can be suitably combined, adapted or exchanged in order to arrive at additional embodiments of the invention.

Below, embodiments of the invention are described in reference to the appended drawing, wherein neither the drawing nor the description should be interpreted as limiting the invention.

DESCRIPTION OF THE DRAWINGS

FIG. 1 shows a diagrammatic view of an embodiment of the inventive cable processing machine system including several cable processing machines and a cable processing machine control system.

The FIGURE is purely diagrammatic and not true to scale. Identical reference numerals in the FIGURES denote identical features or equivalent features.

DETAILED DESCRIPTION

FIG. 1 shows a diagrammatic view of an embodiment of the inventive cable processing machine system 1 including several cable processing machines 10, 20 and a cable processing machine control system 5.

The cable processing machine control system 5 includes a wearable communication device 70 (so-called wearable) and middleware 40 (also known as intermediate system).

The wearable communication device 70 can be or include, for example, a smartphone, a laptop, a tablet computer, a smart watch and/or goggles with an optical display. The wearable communication device 70 is worn by a user 72 or the users of the cable processing machine control system 5. The wearable communication device 70 can include in particular a touch screen display.

The wearable communication device 70 can process the information or data received from the middleware 40 or calculate additional data from the primary data.

The number of the wearable communication devices 70 is equal to at least the number of simultaneous users 72 of the cable processing machine control system 5. This means that each user 72 has his "own" wearable communication device 70 during his work time or shift time, which he carries with himself.

The middleware 40 is the interface between the wearable communication device 70 and the cable processing machines 10, 20. The middleware 40 receives and collects the data or information from the cable processing machines

10, 20. In FIG. 1, two cable processing machines 10, 20 are shown. However, the number can be higher or considerably higher. The number of the cable processing machines 10, 20 can in particular be approximately 10, 50 or 100. The middleware 40 can be or include hardware and/or software.

The middleware 40 comprises several processing units 43 through 47 which each include a functionality, functionalities which run on the respective processing unit. The processing units can each include or be one or more instances of software or hardware.

The middleware 40 assigns a role to the user 72, when the user is logged in or has logged in by means of his wearable communication device 70. Different roles are associated with or assigned to different cable processing machines 10, 20. Usually, a certain number (for example, 10 or 20) of cable processing machines 10, 20 are assigned to each role. Different roles have different rights of access to the cable processing machines 10, 20 or some of them. This means that some roles may carry out only certain processes or actions (for example, acknowledge error messages only of a certain type), while other roles may carry out all types of processes or actions (for example, acknowledge error messages of all types). The action possibilities of the respective role are displayed or can be displayed/retrieved on the wearable communication device 70. In addition, some roles can only have rights of access to the respective cable processing machines 10, 20 assigned to them. By selecting an action possibility, a corresponding control command is transmitted via the wearable communication device 70 via the middleware 40 to the data broker 16, 26 of the corresponding cable processing machine 10, 20. There, the control command is then executed or implemented.

The roles could correspondingly be assigned to a shift plan or a shift table or a shift database. In the shift table or the shift database, it is established which cable processing machines 10, 20 are associated with a certain person or a certain role at a certain time, and which rights of access to the cable processing machines 10, 20 the certain person has at the certain time.

In addition, according to the shift plan or the shift table or the shift database, different cable processing machines 10, 20 can be associated with the different roles.

In particular, there can be so-called operators and so-called supervisors as roles. The operators operate the respective cable processing machines 10, 20 assigned to them, i.e., they supply the cable processing machine 10, 20 with materials, they transport products away and/or they replace cable processing tools used by the cable processing machines 10, 20. Operators have only limited rights of access or action possibilities for controlling the cable processing machines 10, 20 assigned to them. Supervisors are hierarchically above the operators. Several operators are in each case associated with one supervisor. Supervisors have more rights of access or action possibilities or even full rights of access or action possibilities with regard to the cable processing machines 10, 20 associated with them or with the operators subordinate to them. In particular, supervisors can acknowledge error messages which the operator cannot or may not acknowledge.

There can also be additional roles such as, for example, machine setter (a machine setter is authorized to change certain settings of the cable processing machines 10, 20 assigned to him), administrator (an administrator is authorized to vary any type of changes of the settings of all the cable processing machines 10, 20), etc.

The action possibilities can include inter alia the acknowledgment of error messages, the resetting of the state of the cable processing machine 10, 20 (resetting), the varying of parameters of the cable processing process of the cable processing machine 10, 20, the starting or stopping of the cable processing machine 10, 20 and/or the switching between several cable processing tools present in the cable processing machine 10, 20.

The information on the cable processing machine 10, 20 can include, inter alia, the cable processing process of the respective cable processing machine 10, 20, which has just been carried out, error messages of the respective cable processing machine 10, 20, how long the respective cable processing machine 10, 20 needs to complete the currently carried out cable processing process, the efficiency of the respective cable processing machine 10, 20, the operator, supervisor and/or administrator responsible for the respective cable processing machine 10, 20, the position of the respective cable processing machine 10, 20, the cable processing tool currently used by the respective cable processing machine 10, 20, the filling level of an intake/filling tray for finished products of the respective cable processing machine 10, 20 and/or the filling level of materials to be processed of the respective cable processing machine 10, 20.

In addition, the middleware 40 can communicate or exchange data with an enterprise resource planning unit 50 (for example, SAP R/3) and/or a production management system 55. The enterprise resource planning unit 50 or the production management system 55 can control the cable processing machines 10, 20 partially or completely.

Each of the cable processing machines 10, 20 includes a data broker 16, 26, a database 17, 27, one or more sensors and/or actuators 13-15, 23-25, control software 12, 22, and a user interface 11, 21. The data broker 16, 26 communicates with the additional elements of the cable processing machine 10, 20 and with the middleware 40 and exchanges data with the middleware 40. The control software 12, 22 controls the procedures within the cable processing machine 10, 20.

The database 17, 27 can also be a common database of several cable processing machines 10, 20 or a common database of all the cable processing machines 10, 20. In the database 17, 27, process parameters, the jobs or orders of the cable processing machines 10, 20 that have been processed so far, quality feedback data, data on the state of the cable processing machines 10, 20, etc., can be stored.

The sensors or actuators 13-15, 23-25 measure certain states of the cable processing machine 10, 20 or they perform or carry out certain mechanical, hydraulic, electric or electromechanical processes in the cable processing machine 10, 20.

It is also possible that inputs of an operator or of the operator of the cable processing machine system 1 or his interaction with the cable processing machine system 1 or a portion thereof are interpreted as coming from sensor or actuator of the cable processing machine system 1 or treated as such. In particular, inputs of the operator of the cable processing machine system 1 can be interpreted by the middleware as data from a sensor and/or from an actuator. Certain actions of an operator of the cable processing machine system 1 can be recognized.

The operator can input data or values into the cable processing machine system 1, for example, via a machine interface of the cable processing machine system 1, which data or values are interpreted by the cable processing machine system 1 as data or values from a sensor and/or of an actuator or treated as such.

It is also conceivable that the operators of the cable processing machine system 1 include a robot or several robots. Inputs of the robot can be interpreted as data from a sensor and/or from an actuator of the cable processing machine system 1 or treated as such. In addition to the robot, one or more humans can also be operators of the cable processing machine system 1.

The operators of the cable processing machine system 1 each have specific capabilities or individual capabilities and individual or specific rights of access to the cable processing machine system 1 or portions thereof or to the cable processing machines 10, 20.

The user interface 11, 21 is used for communicating with the user 72. The user interface 11, 21 can include, for example, a keyboard, a computer mouse and a monitor.

The data broker 16, 26 exchanges data with the middleware 40. The data broker 16, 26 (also referred to as a broker or information broker) represents an interface between the individual elements of the respective cable processing machine 10, 20 on one side and the middleware 40 on the other side. The data broker 16, 26 can include or be hardware and/or software.

The data connections between the data brokers 16, 26 of the cable processing machines 10, 20 and of the middleware 40 can in each case occur by wire or wirelessly. The data connection between the middleware 40 and the wearable communication device 70 occurs wirelessly.

The cable processing machine 10, 20 can be in particular a crimping machine. The cable processing tool can be a crimping tool. The materials can include, for example, cables, cable elements and/or contact strips or the like.

The cable processing machine control system 5 can acquire the position of materials, cable processing tools, etc. This can be carried out, for example, by RFID chips. If then a material or a cable processing tool on a cable processing machine 10, 20 is needed, the user 72 can quickly learn the position or the site of the material or of the cable processing tool via his wearable communication device 70 or this can be displayed for him on his wearable communication device 70. The route to the position or to the site can also be displayed for him on the wearable communication device 70. Moreover, the person currently responsible for the material or for the cable processing tool can be informed via the wearable communication device 70 of the fact that a material or a cable processing tool will be picked up by someone soon and of which material or cable processing tool will be picked up.

By means of the cable processing machine control system 5, it is possible, for example, to simplify the material logistics, in particular the material and identification support. This is explained below in reference to a first example.

The users 72 of the cable processing machines 10, 20 each have a wearable communication device 70 (wearable) which they can wear at all times during their work time. By means of this communication device, information made available for the respective user 72 on the material for the upcoming order can be provided in a site-independent manner. At the beginning of the shift, the operator logs in on his wearable communication device 70. His role ("operator") as well as the cable processing machines 10, 20 assigned to him or to his role are determined based on a role database and/or based on a shift table. This can be carried out in particular by the middleware 40. Thus, his role as well as the cable processing machines 10, 20 assigned to him are established.

Via his wearable communication device 70, the user receives the communication that he should replace the cable for the now upcoming job or process of the cable processing machine 10, 20, as well as the identification number of the cable to be replaced. During the replacement of the cable, the operator has a display on his wearable communication device 70 indicating which cable drum is the correct one (if he has a selection of drums available), since at that time he is not in front of the operation monitor of the cable processing machine 10, 20. Even if he himself has to go get the corresponding cable from "cable storage," it is displayed on his wearable communication device 70 which of several cables is the correct cable.

If a role of the material provider is defined, the provider also logs in (at the start of his shift or his work time) on a wearable communication device 70. Thus, his role as well as the cable processing machines 10, 20 assigned to him are also defined or established. If a cable replacement in the above cable processing machine 10, 20 is upcoming, it is displayed for the material provider on his wearable communication device 70 or said material provider is informed via his wearable communication device 70 as to the cable processing machine 10, 20 assigned to him in which a material replacement is to be carried out, and the material provider can provide the correct material to the corresponding cable processing machine 10, 20. The material provider can bring the material or the materials to the corresponding cable processing machines 10, 20 or he makes the material or the materials available to the operator who picks up the material or the materials. In this way, the replacement of material on the cable processing machines 10, 20 is simplified and accelerated.

By means of the cable processing machine control system 5, it is possible, for example, to simplify and accelerate a replacement of a cable processing tool of a cable processing machine 10, 20. This is explained below in reference to a second example.

For the next order for a cable processing machine 10, 20, the operator needs a cable processing tool other than the cable processing tool loaded or currently being used in the cable processing machine 10, 20. At the start of the shift, the operator logs in on his wearable communication device 70 (wearable). A role based on a shift table, a shift database or the like is assigned to him by the middleware 40 based on his log-in data. Several cable processing machines 10, 20 are assigned to the role, and thus also assigned to the user 72 or operator. Thus, his role as well as the cable processing machines 10, 20 assigned to him are established.

During the loading of a new order, he sees both on the display of the cable processing machine 10, 20 and also on his wearable communication device 70 (wearable) that, for the new order, he needs a contact roll as well as a crimping tool other than those present in the cable processing machine 10, 20. By means of the middleware 40, it is known which cable processing tool is to be used and where this material is located at the time (for example, in storage, on the shelf next to the cable processing machine 10, 20, on the adjacent cable processing machine 10, 20). Thereby, the operator can retrieve this information, namely where the cable processing tool is located, via his wearable communication device 70 or this is actively displayed to him. If the cable processing tool is in storage, then the storage employee (who also logs in on his wearable communication device 70 and whose role is thus defined or established) in turn receives a display or is informed via his wearable communication device 70 that he must hand over said cable processing tool to the operator. If the cable processing tool is located on another cable processing machine 10, 20, the operator of this cable processing machine 10, 20 learns via a display on his wearable communication device 70 that his cable processing tool is to be picked up and used by another operator. Thus, an exchange or replacement of the cable processing tool can be simplified and accelerated.

By means of the cable processing machine control system 5, an acknowledgment of error messages from cable processing machine 10, 20 can thus be simplified and accelerated, for example. This is explained below in reference to a third example.

At the start of the shift, both the operator and the shift supervisor log in each on their wearable communication devices 70. Thus, both for the operator and for the supervisor, the role and the cable processing machine 10, 20 assigned to each of them are determined. During his shift, the operator receives all the error messages of the cable processing machine 10, 20 assigned to him, including the indication of the cable processing machine 10, 20 on which the error occurs, displayed on his wearable communication device 70 (optionally with corresponding acoustic indications and/or with tactile indications, i.e., for example, by means of a vibration alarm). This is important in particular if the operator is not directly in front of the monitor of the corresponding cable processing machine 10, 20 which displays the error, but also if two of the cable processing machines 10, 20 assigned to him both exhibit an error. Thus, the operator also knows by means of the wearable communication device 70 what needs to be done, without having to first go around the cable processing machine 10, 20 in order to read the error on the monitor of the cable processing machine 10, 20. The supervisor, for his part, does not receive the "normal" errors or the non-important errors of the cable processing machine 10, 20 assigned to him displayed on his wearable communication device 70 on a display, since normally he need not be concerned with them.

However, if a cable processing machine 10, 20 then exhibits an error which may not be acknowledged or confirmed or corrected by the operator, but only by the supervisor (otherwise the operator or the cable processing machine 10, 20 cannot continue to work), this error message is represented for the supervisor on his wearable communication device 70, including on the corresponding cable processing machine 10, 20, and for the user with whom or to whom this cable processing machine 10, 20 is currently associated or assigned, respectively. This error is also represented for the operator on the wearable communication device 70 with the additional information indicating which supervisor is responsible for it. The supervisor can thus promptly go to the corresponding cable processing machine 10, 20, if applicable log in there, and confirm or correct the error, so that the operator of the corresponding cable processing machine 10, 20 or the cable processing machine 10, 20 can continue to work. An acknowledgment of the error of the cable processing machine 10, 20 by means of the wearable communication device 70 remotely is also possible. Consequently, the acknowledgment of error messages becomes or is accelerated and simplified. This leads to shorter interruptions of the operation of the cable processing machines 10, 20.

By means of the cable processing machine control system 5, it is possible, for example, to rapidly correct or eliminate a poor performance or inefficiency of a cable processing machine 10, 20. This is explained below in reference to a fourth example.

At the start of the shift, both the operator and the shift supervisor log in respectively on their wearable communication devices 70. Thus, both for the operator and for the supervisor, the role and the cable processing machines 10, 20 assigned to them are determined.

During the shift, the supervisor sees which of his cable processing machines 10, 20 to be monitored are not running optimally, either due to non-ideal process parameters or to too many process errors. However, he also sees when a cable processing machine 10, 20 takes a long time to set up a job and start production. In the case of poor process parameters, he can propose to the cable processing machines 10, 20 or to the operator of the cable processing machines 10, 20 that the production be carried out with more optimal process parameters.

The operator, for his part, is given a display on his wearable communication device 70 indicating that the supervisor has made a proposal for optimizing a cable processing machine 10, 20 assigned to him, and the operator can accept or reject the proposal. In the case of too many process errors or an excessively long setup time, the supervisor personally goes to the cable processing machines 10, 20 and attempts to correct the problem on site. Thus, an inefficiency of a cable processing machine 10, 20 can be corrected rapidly. This reduces the production time and the production costs of the cable to be processed.

The applications and the software which run on the wearable communication device 70 include all the common technologies (native applications, containers such as docker/LXC/LXD and also web applications, etc.). The same applies for the software on the intermediate system or the middleware 40.

The software on the wearable communication device 70 and/or the software on the intermediate system or the middleware 40 can be installed/set up or delivered or deployed in different ways on the wearable communication device 70 and/or on the middleware. This can be carried out locally and/or by means of remote maintenance.

In each case, the different roles receive different information on their wearable communication device 70. For example, the OEE (overall equipment effectiveness) parameters of the cable processing machines 10, 20 assigned to the operator are displayed for the operator or these values can be retrieved. In each case, the machine setter receives a display of the OEE parameters of the cable processing machines 10, 20 assigned to him and of the operators associated with or assigned to cable processing machines 10, 20, or this information can be retrieved. The OEE parameters of all the cable processing machines 10, 20 are displayed on the wearable communication device 70 for the plant managers without knowledge of the operators assigned to the cable processing machines 10, 20.

It is conceivable that multiple middleware 40 are present next to one another. The multiple middleware 40 do not know of the existence of additional middleware 40. The wearable communication device 70 communicates or exchanges data with all the middleware 40 present.

During the log-in of the different users 72 of the cable processing machine system 1 or of the cable processing machine control system 5, an authentication (for example, a password or a two-way authentication) can be requested in each case.

In conclusion, it is pointed out that terms such as "comprising," "including," etc. do not exclude other elements or steps and that terms such as "a" or "an" do not exclude a plurality. Furthermore, it is pointed out that features or steps described in reference to one of the above embodiment examples can also be used in combination with other features or steps of other above-described embodiment examples.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A cable processing machine control system for controlling a cable processing machine system having multiple cable processing machines, the cable processing machine control system comprising:
   middleware for exchanging data with data brokers of the cable processing machines;
   a wearable communication device for exchanging data with the middleware when a user of the cable processing machine control system has logged into the wearable communication device, wherein the middleware assigns a role to the user, and the role is selected from a hierarchy including at least an operator role and a supervisor role; and
   wherein the wearable communication device includes a display that displays to the user information concerning the cable processing machines, which information is associated with the role assigned to the user, and displays to the user action possibilities for controlling the cable processing machines, which action possibilities are associated with the role assigned to the user, and the device transmits to the middleware a control command selected by the user from the action possibilities, whereupon the control command is forwarded by the middleware to a corresponding one of the cable processing machines for implementation.

2. The cable processing machine control system according to claim 1 wherein the middleware assigns the role depending on at least one of a role database and a role shift table.

3. The cable processing machine control system according to claim 1 wherein the role assigns ones of the cable processing machines to the user depending on at least one of a role database and a role shift table.

4. The cable processing machine control system according to claim 1 wherein the wearable communication device includes at least one of a laptop, a smartphone, a tablet computer, a smart watch and goggles with an optical display.

5. The cable processing machine control system according to claim 1 wherein the wearable communication device acquires and displays at least one of positions of cable processing tools for the cable processing machines and positions of materials for the cable processing machines.

6. The cable processing machine control system according to claim 1 wherein the middleware exchanges data with at least one of an enterprise resource planning unit and a production management system.

7. A cable processing machine system comprising:
   multiple cable processing machines, each of the cable processing machine including a data broker that exchanges data with at least one of associated sensors and associated actuators; and
   a cable processing machine control system that at least one of exchanges data with the cable processing machines and controls the cable processing machines, the cable processing machine control system including middleware for exchanging data with the data brokers of the cable processing machines,
      a wearable communication device for exchanging data with the middleware when a user of the cable processing machine control system has logged into the wearable communication device, wherein the middleware assigns a role to the user, and the role is selected from a hierarchy including at least an operator role and a supervisor role, and
      wherein the wearable communication device includes a display that displays to the user information concerning the cable processing machines, which information is associated with the role assigned to the user, and displays to the user action possibilities for controlling the cable processing machines, which action possibilities are associated with the role assigned to the user, and the device transmits to the middleware a control command selected by the user from the action possibilities, whereupon the control command is forwarded by the middleware to a corresponding one of the cable processing machines for implementation.

8. The cable processing machine system according to claim 7 wherein the middleware exchanges data with at least one of an enterprise resource planning unit and a production management system.

9. A method for monitoring and controlling cable processing machines, the method including the following steps:
   logging in a user on a wearable communication device having a display, wherein the wearable communication device exchanges data with middleware and the middleware exchanges data with data brokers of the cable processing machines;
   determining a role of the user by the middleware and assigning the role to the user, where the role is selected from a hierarchy including at least an operator role and a supervisor role;
   assigning ones of the cable processing machines to the user depending on the role;
   displaying on the wearable communication device display information of the cable processing machines assigned to the user wherein the displayed information is dependent on the role assigned to the user;
   displaying on the wearable communication device display action possibilities for control of the cable processing machines assigned to the user; and
   controlling, using the wearable communication device, the assigned cable processing machines according to any of the action possibilities selected by the user.

10. The method according to claim 9 including assigning the role depending on at least one of a role database and a role shift table.

11. The method according to claim 9 wherein the information displayed for the user on the wearable communication device is received by the middleware from the cable processing machines and transmitted by the middleware to the wearable communication device.

12. The method according to claim 9 wherein the middleware exchanges data with at least one of an enterprise resource planning unit and a production management system.

13. The method according to claim 9 including acquiring positions of at least one of cable processing tools and materials for the cable processing machines and displaying the acquired positions on the wearable communication device.

14. The method according to claim 9 including associating ones of the cable processing machines with the role depending on at least one of a role database and a role shift table.

15. The cable processing machine control system according to claim 1 wherein the information concerning the cable processing machines includes at least one of:
   a cable processing process of the respective cable processing machine which has just been carried out;

error messages of the respective cable processing machine;

how long the respective cable processing machine needs to complete the currently carried out cable processing process;

an efficiency of the respective cable processing machine;

an operator, a supervisor and/or an administrator responsible for the respective cable processing machine;

a position of the respective cable processing machine;

a cable processing tool currently used by the respective cable processing machine;

a filling level of an intake/filling tray for finished products of the respective cable processing machine; and a filling level of materials to be processed of the respective cable processing machine.

16. The cable processing machine system according to claim 7 wherein the information concerning the cable processing machines includes at least one of:

a cable processing process of the respective cable processing machine which has just been carried out;

error messages of the respective cable processing machine;

how long the respective cable processing machine needs to complete the currently carried out cable processing process;

an efficiency of the respective cable processing machine;

an operator, a supervisor and/or an administrator responsible for the respective cable processing machine;

a position of the respective cable processing machine;

a cable processing tool currently used by the respective cable processing machine;

a filling level of an intake/filling tray for finished products of the respective cable processing machine; and a filling level of materials to be processed of the respective cable processing machine.

17. The method according to claim 9 wherein the information of the cable processing machines includes at least one of:

a cable processing process of the respective cable processing machine which has just been carried out;

error messages of the respective cable processing machine;

how long the respective cable processing machine needs to complete the currently carried out cable processing process;

an efficiency of the respective cable processing machine;

an operator, a supervisor and/or an administrator responsible for the respective cable processing machine;

a position of the respective cable processing machine;

a cable processing tool currently used by the respective cable processing machine;

a filling level of an intake/filling tray for finished products of the respective cable processing machine; and a filling level of materials to be processed of the respective cable processing machine.

\* \* \* \* \*